United States Patent
Clifton et al.

(10) Patent No.: US 9,395,852 B2
(45) Date of Patent: Jul. 19, 2016

(54) METHOD FOR DISTINGUISHING BETWEEN EDGE SWIPE GESTURES THAT ENTER A TOUCH SENSOR FROM AN EDGE AND OTHER SIMILAR BUT NON-EDGE SWIPE ACTIONS

(71) Applicant: CIRQUE CORPORATION, Salt Lake City, UT (US)

(72) Inventors: Trevor C. Clifton, Lehi, UT (US); Daniel B. Kondel, Lehi, UT (US); Richard D. Woolley, Orem, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 83 days.

(21) Appl. No.: 13/875,123

(22) Filed: May 1, 2013

(65) Prior Publication Data

US 2013/0293510 A1     Nov. 7, 2013

Related U.S. Application Data

(60) Provisional application No. 61/643,488, filed on May 7, 2012.

(51) Int. Cl.
*G06F 3/044* (2006.01)
*G06F 3/0488* (2013.01)

(52) U.S. Cl.
CPC ............ *G06F 3/044* (2013.01); *G06F 3/04883* (2013.01)

(58) Field of Classification Search
CPC ... G06F 3/044; G06F 3/0485; G06F 3/04855; G06F 3/0488; G06F 3/04883
See application file for complete search history.

(56) References Cited

U.S. PATENT DOCUMENTS

| | | | | |
|---|---|---|---|---|
| 5,757,368 A * | 5/1998 | Gerpheide et al. | ............ | 715/769 |
| 7,394,453 B2 * | 7/2008 | Woolley et al. | ................ | 345/157 |
| 8,411,060 B1 * | 4/2013 | Scholler et al. | ................ | 345/173 |
| 2003/0043113 A1 * | 3/2003 | Itoh | ................ | 345/156 |
| 2010/0214249 A1 * | 8/2010 | Ikeda | .................. | G06F 3/04883 345/173 |
| 2010/0302172 A1 * | 12/2010 | Wilairat | .............. | G06F 3/04883 345/173 |
| 2012/0131519 A1 * | 5/2012 | Jitkoff | .................... | G06F 3/0481 715/863 |
| 2012/0236022 A1 * | 9/2012 | Homma | ................ | G06F 3/0488 345/619 |
| 2013/0117715 A1 * | 5/2013 | Williams | ............ | G06F 3/04883 715/835 |
| 2013/0135209 A1 * | 5/2013 | Zhai et al. | ...................... | 345/168 |

* cited by examiner

*Primary Examiner* — Larry Sternbane
(74) *Attorney, Agent, or Firm* — Morriss O'Bryant Compagni, PC (57) ABSTRACT

A method for detecting and tracking a single finger or multi-finger gesture referred to as an edge swipe gesture that originates from an edge of a touch sensor and which is distinguished from normal touch sensor operations such as cursoring, wherein the edge swipe gesture generates detection and tracking data having an immediate change, whereas touchdown or movement towards and then away from an edge of the touch sensor will generate data that is different from the edge swipe gesture.

15 Claims, 8 Drawing Sheets

METHOD FOR DISTINGUISHING BETWEEN EDGE SWIPE GESTURES THAT ENTER A TOUCH SENSOR FROM AN EDGE AND OTHER SIMILAR BUT NON-EDGE SWIPE ACTIONS

BACKGROUND OF THE INVENTION

1. Field of the Invention

This invention relates generally to touch sensor technology. More specifically, the present invention is a system for distinguishing single and/or multiple finger swipes or actions upon entering a touch-surface area from the touch-surface edges to activate specific gestures or commands, as compared to normal cursoring or gesturing directly on the touch-surface.

2. Description of Related Art

There are several designs for capacitance sensitive touchpads. It is useful to examine the underlying technology to better understand how any capacitance sensitive touchpad can be modified to work with the present invention.

Figure 1:
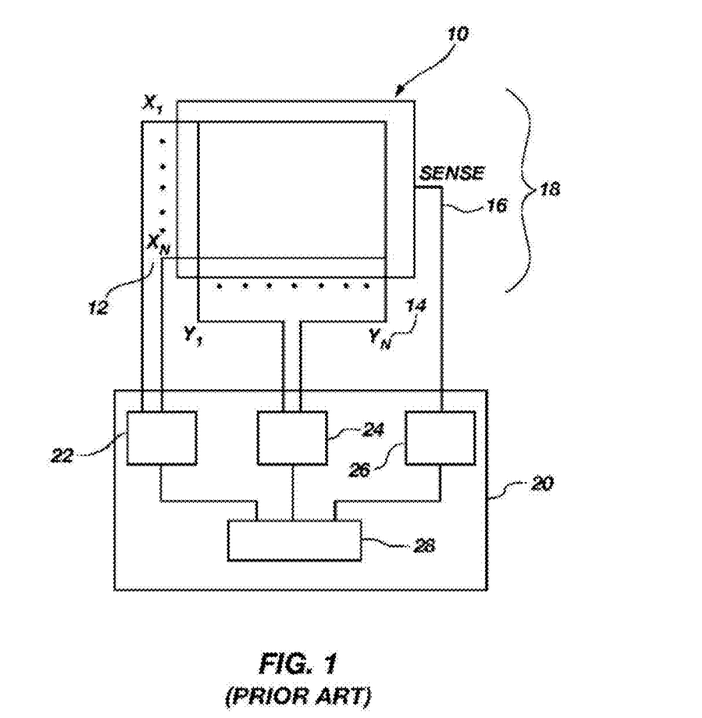
FIG. 1 is a block diagram of the components of a capacitance-sensitive touchpad as made by CIRQUE® Corporation and which can be operated in accordance with the principles of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

Having described a touchpad that can be modified to operation with the principles of the present invention, it is useful to understand that there are systems that already teach the recognition of a finger swipe or multiple finger swipes that enter a touch surface from the edge of a touchpad. However, some of these systems are not perfect in the manner in which they distinguish between a typical cursoring function and the gesture being performed. Accordingly, it would be an improvement to teach a new system and method for detecting and tracking movement of a finger or fingers on a capacitance sensitive touchpad.

BRIEF SUMMARY OF THE INVENTION

In a preferred embodiment, the present invention is a method for detecting and tracking a single finger or multi-finger gesture referred to as an edge swipe gesture that originates from an edge of a touch sensor and which is distinguished from normal touch sensor operations such as cursoring, wherein the edge swipe gesture generates detection and tracking data having an immediate change, whereas touchdown or movement towards and then away from an edge of the touch sensor will generate data that is different from the edge swipe gesture.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow. It should also be understood that the terms "touchpad", "touchscreen", "touch sensor", "touch input device" and "touch sensitive device" may be used interchangeably throughout this document.

The first embodiment of the present invention is a new system and method for distinguishing between a typical cursoring or gesture function that is being performed by one or more fingers (also referred to as pointing objects) on a touch sensor, and a gesture that is characterized by swiping onto a touch sensor from any surrounding edge.

The position data produced when swiping a finger from the edge of a touch sensor and toward the middle of the touch sensor may produce ambiguous position data regarding the action being performed. The position data may indicate that either normal cursoring should be performed or an edge action gesture should be performed. The ambiguous position data may be generated from one or multiple fingers that enter the touch sensor from the edge.

Figure 2:
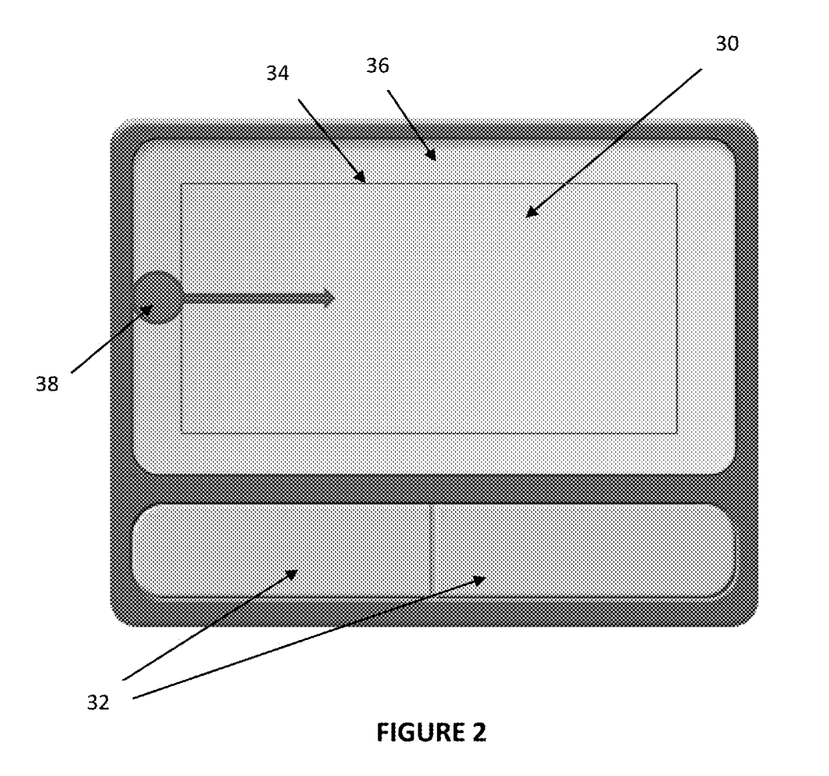
FIG. 2 is a top view of a touch sensor that demonstrates that a finger has made touchdown on the touch sensor and that an edge swipe gesture has not been performed.

For example, consider FIG. 2. FIG. 2 is a top view of a touch sensor 30. The touch sensor 30 may or may not include one or more dedicated buttons 32 associated with the touch sensor. These dedicated buttons 32 are not relevant to the present invention but are shown for illustration purposes only.

A line 34 is shown on the touch sensor 30 that is an indication of a boundary zone 36 around the touch sensor that is an indication of an outer edge boundary. The width of the boundary zone 36 may be changed as desired, and is not a limitation of the present invention.

Figure 3:
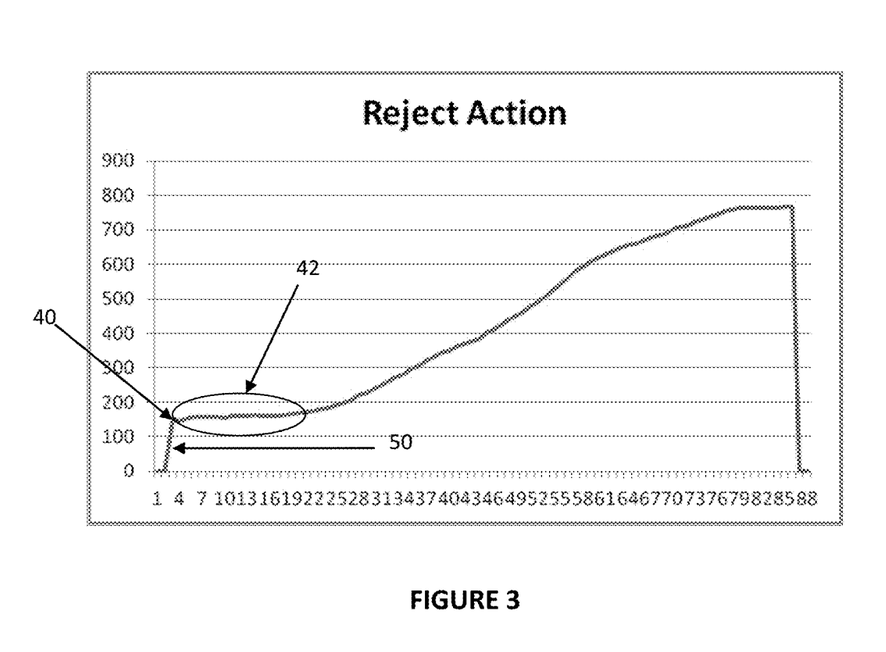
FIG. 3 is a graph that illustrates finger detection and position tracking data that shows that the finger paused before movement, and is therefore not an edge swipe gesture.

The location 38 that is represented by a circle is indicative of a touchdown by a pointing object such as a finger. FIG. 3 is provided as a graph of position detection and tracking data. The Y axis is indicative of position along an X axis of the touch sensor 30. It should be understood that the position information may show movement along any axis of the touch sensor 30, and the position being shown is for illustration purposes only. The X axis of the graph is time, as represented by counts. What is important is that a straight line is indicative of no movement of a finger, and a slope, up or down, is indicative of movement of the finger.

In this example, FIG. 3 shows touchdown using arrow 40. The oval 42 surrounds a portion of the line that is level or a plateau that is indicative of a period of time where there is substantially no movement of the finger. In the first embodiment of the present invention, what appears to be a touchdown 38 followed immediately by a lack of movement 42 is an indication that a finger made touchdown and then moved. The present invention may interpret the behavior of the finger as represented by the position detection and tracking data shown in the graph of FIG. 3 to indicate that an edge swipe gesture was not performed, but rather a cursoring function.

Figure 4:
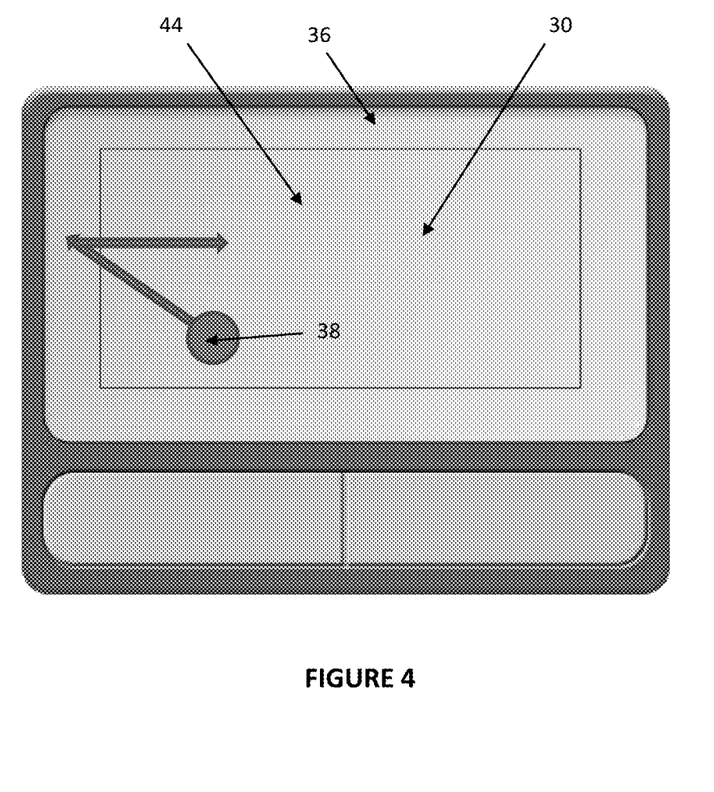
FIG. 4 is a top view of a touch sensor that demonstrates that a finger has made touchdown on the touch sensor in a normal zone, moved to the boundary zone, and then back to the normal zone, and is not interpreted as an edge swipe gesture.

FIG. 4 is an illustration of a top view of the touch sensor 30. Touchdown occurs as indicated by arrow 38 in a normal zone 44. The finger moves from a location on the touch sensor 30 is in the normal zone 44, then moves to the boundary zone 36, and then back into the normal zone. This action is also not interpreted as indicative of an edge swipe gesture.

Figure 5:
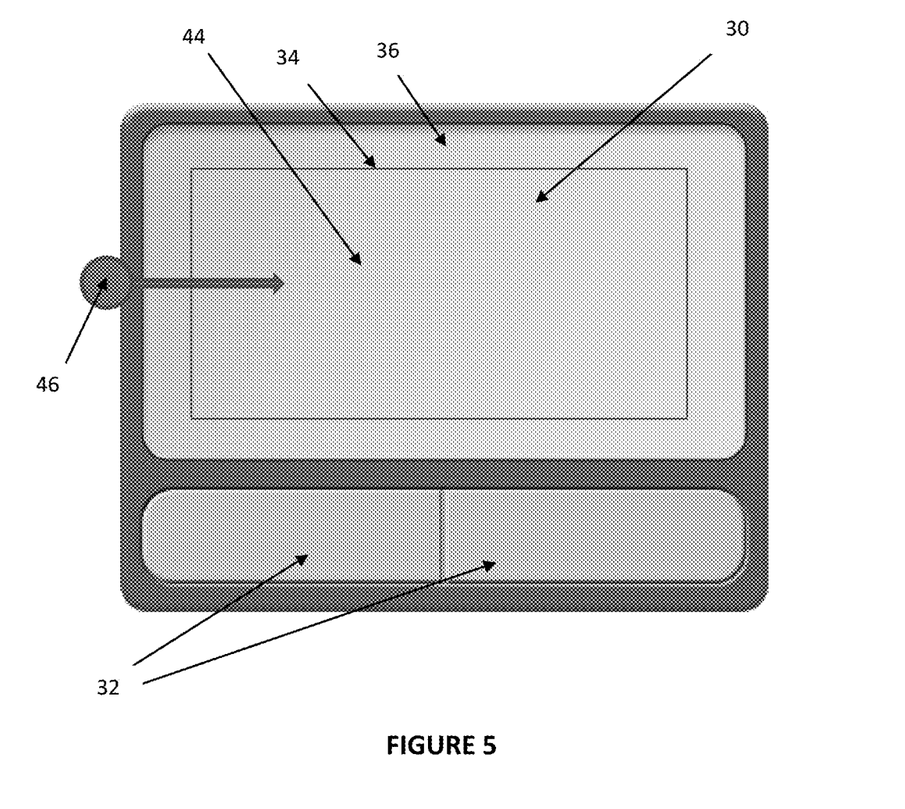
FIG. 5 is a top view of a touch sensor that demonstrates that a finger has made touchdown outside the touch sensor, and then moves onto the touch sensor to make an edge swipe gesture.

FIG. 5 is a top view of the touch sensor 30, the buttons 32, a boundary zone 36 and a normal zone 44 separated by a line 34. In the first embodiment of the present invention, a swipe that is initiated from off of the touch sensor will produce a different set of finger (or fingers) position detection and tracking data as compared to a finger touchdown on the touch sensor followed by a swipe as shown in FIGS. 2 and 3. Touchdown is shown as having occurred off the touch sensor 30 at location 46. The finger is then shown as moving on to the touch sensor, through the boundary zone 36 and into the normal zone 44.

Figure 6:
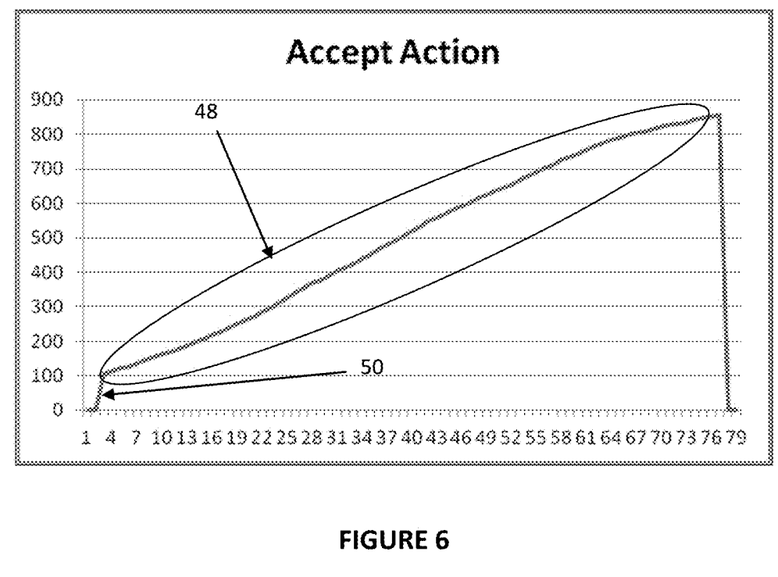
FIG. 6 is a graph that illustrates finger detection and position tracking data that shows that the finger was moving immediately upon entering the touch sensor and is therefore characterized as an edge swipe gesture.

FIG. 6 is a graphical representation of finger position detection and tracking data for the finger shown in FIG. 5. A finger moving onto the touch sensor 30 from any location off the touch sensor may produce a graph showing a constant upward or downward slope in finger position detection and tracking data when an edge swipe gesture is initiated from off the touch sensor.

In this example, there is no leveling of the line. The absence of a level line, and thus the presence of an upward (or downward) slope as indicated by oval 48, may indicate that the finger is moving the moment that it moves on to the surface of the touch sensor 30, and for at least some period of time after. This behavior may be interpreted to be an indication of an edge swipe gesture.

It should be understood that the finger could move onto the touch sensor 30 from any of the edges, and not just from the left edge as shown in FIG. 5. Furthermore, the graph shown in FIG. 6 could also be indicative of an edge swipe gesture from any of the edges of the touch sensor 30. The upward slope shown in oval 48 may also be represented by a downward slope which would simple mean movement in an opposite direction if the finger entered the touch sensor 30 from a right edge.

It should also be understood that the Y axis of the graph could also be representative of movement along the Y axis of the touch sensor 30 and not the X axis if the finger were to move onto the touch sensor 30 from the top edge or the bottom edge.

It is also noted that the first indication that a finger has been detected is shown by the arrow 50 in FIG. 6. This portion of the finger position detection and tracking data is indicative of the presence of the finger being sensed before it is moved onto the touch sensor 30. Likewise, in FIG. 3, the portion of the line indicated by arrow 50 also shows that the presence of the finger can be detected as it is lowered onto the touch sensor 30 from above before touchdown occurs.

Three observations can be made from graphical representation of finger position and tracking data in FIG. 6. First, the finger or fingers will not appear motionless at the point in time that the finger is moving onto the touch sensor 30.

The second observation is that the edge swipe gesture may be a very short-lived event in time. In other words, very little movement of a finger is needed to show that the edge swipe gesture has been initiated. Thus, movement may also quickly come to a halt as indicated by a leveling of the line. The edge swipe gesture may then be interrupted by removal of the finger from the touch sensor 30, or movement may begin again.

A third observation is that an upward slope is generated in position data when a finger enters the touch sensor from a first side, and a downward slope is generated when the finger enters from an opposite or second side of the touch sensor. It is not important which side shows an upward slope and which side shows a downward slope. What is important is that the slope exists because that indicates movement of a finger from an edge onto the touch sensor 30.

In another aspect of the invention, if the slope is in one direction when the finger is moving, reversing the direction of the finger may result in a reversal of the direction of the slope. Nevertheless, this reversal of direction may also be recognized as part of the edge swipe gesture.

What is important for recognition of an edge swipe gesture is that the slope exists for at least some minimum distance so that the movement can be classified as a "constant" slope up or down, and that the slope begins immediately when it is being tracked by the touch sensor 30. In other words, there should be no initial level period.

Another observation regarding the first embodiment is that it shows that it is possible to quickly reject finger position detection and tracking data that does not show a valid edge swipe gesture and determine that the movement being detected is a cursoring or other function because the level line is an indicator of a pause at touchdown.

The first embodiment of the present invention describes the ability to distinguish between a single or multi-finger edge swipe gesture, and alternative scenarios such as the finger beginning at the inside edge of the touch sensor, or cursoring over to the boundary zone 36 of the touch sensor 30 and then moving back away from an edge with a single or multiple fingers. Accordingly, the first embodiment includes the ability to distinguish edge swipe gestures that are performed with single or multiple fingers.

Figure 7:
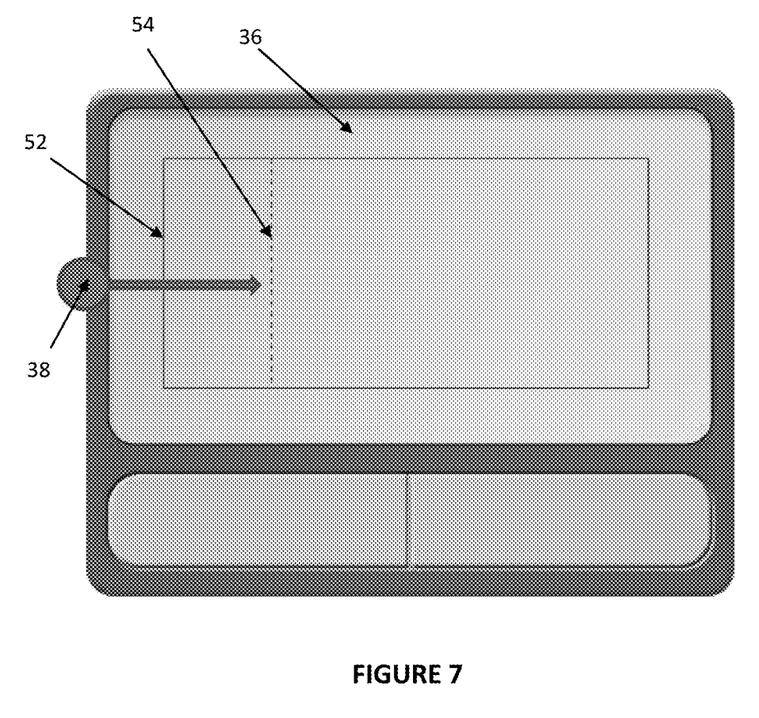
FIG. 7 is a top view of a touch sensor that demonstrates that a finger has made touchdown outside the touch sensor, and then moves onto the touch sensor very rapidly to make an edge swipe gesture which is recognized by dynamically moving an edge of the boundary zone.

In another embodiment of the present invention, a different aspect of the invention relates to the speed with which a finger is entering the touch sensor 30. Consider the touch sensor 30 shown in FIG. 7. FIG. 7 shows the normal left edge 52 of the boundary zone 36. In this alternative embodiment of the invention, if the finger makes touchdown at location 38 but moves so quickly through the boundary zone 36 such that in a next sample of position it has already moved into the normal zone 44, it may be necessary to make the edges of the boundary zone 36 to be dynamically changeable. For example, the left edge 52 of the boundary zone 36 might be moved to dotted line 54. The change in position of the left edge 52 is only temporary and may revert to its original position once the edge swipe gesture is complete. What is important is that the edge swipe gesture not be unrecognized simply because the finger or fingers moved onto the touch sensor 30 so rapidly that position data was not keeping up with the rate of movement. Temporary movement of any of the edges of the touch sensor 30 may be possible when needed.

Another way to examine this alternative embodiment is to examine the finger position detection and tracking data that may be used to generate a graph. FIG. 6 was used to recognize an edge swipe gesture.

Figure 8:
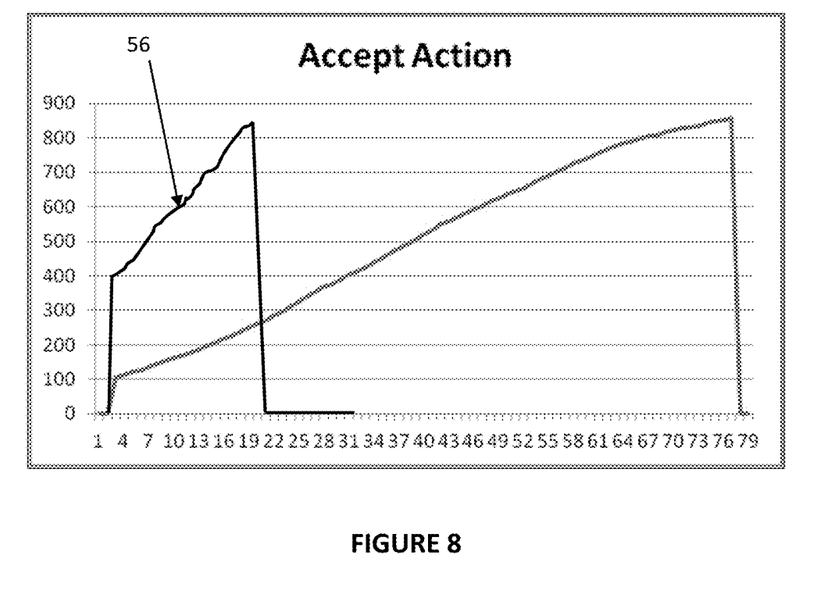
FIG. 8 is a graph that illustrates finger detection and position tracking data that shows that the finger was moving immediately upon entering the touch sensor and is therefore characterized as an edge swipe gesture, the finger characterized as being farther into the touch sensor when detected and having a steeper slope.

FIG. 8 is a graph that illustrates the concept that a more rapid movement of a finger onto the touch sensor 30 may be represented by a line 56 having two characteristics. The first characteristic is a line that starts much higher on the Y axis. The Y axis is representative of an absolute position. Thus, because the finger has moved so rapidly, a first detected position may be further into the touch sensor 30 than a slower moving finger, which may be represented as higher up on the Y axis.

The second characteristic that the line 56 for a rapidly moving finger may have a steeper slope, either up or down, as shown in FIG. 8.

In another aspect of the invention, various position characteristics of the detected finger may be used alone or in combination in order to analyze the movement of the finger to determine if an edge swipe gesture is being performed. These position characteristics include, but should not be considered as limited to, constant slope after detection, degree of slope, and initial position of the pointing object.

In another aspect of the invention, an edge swipe gesture may not only have to have immediate movement upon entering the touch sensor 30, but there may also be a requirement for movement of a threshold distance onto the touch sensor 30.

It is noted that the same finger detection and position tracking data may be gathered for multiple fingers simultaneously.

The edge swipe gesture may be any gesture function that is known to those skilled in the art. The present invention is not limited by the specific function being activated by the edge swipe gesture. The present invention addresses how to recognize an edge swipe gesture and how to distinguish it from finger movements that are not edge swiping gestures.

It is to be understood that the above-described arrangements are only illustrative of the principles of the present invention. Numerous modifications and alternative arrangements may be devised by those skilled in the art without departing from the spirit and scope of the present invention. The appended claims are intended to cover such modifications and arrangements.

What is claimed is:

1. A method for distinguishing between an edge swipe gesture and other touch functions on a touch sensor that detects at least one pointing object, said method comprising:
   (1) providing a capacitance sensitive touch sensor having an edge around a perimeter thereof;
   (2) detecting at least one pointing object by the touch sensor in a boundary zone adjacent to the edge of the touch sensor, wherein the at least one pointing object has slid onto the touch sensor from a location that is off the touch sensor;
   (3) generating finger detection and position tracking data for the at least one pointing object; and
   (4) analyzing the finger detection and position tracking data, wherein finger detection and position tracking data that shows a pause in movement of the at least one pointing object immediately after detection in the boundary zone is characterized as a non-edge swipe gesture, wherein finger detection and position tracking data that shows immediate movement of the at least one object immediately after detection in the boundary zone is characterized as an edge swipe gesture, and temporarily expanding the boundary zone adjacent to the edge of the touch sensor if the at least one pointing object is moving rapidly to thereby compensate for the rapid movement that might otherwise not be recognized as an edge swipe gesture.

2. The method as defined in claim 1 wherein the step of analyzing the finger detection and position tracking data further comprises defining a constant upward or downward slope in position data to be indicative of the edge swipe gesture.

3. The method as defined in claim 2 wherein the step of analyzing the finger detection and position tracking data further comprises defining finger detection and position tracking data that shows a plateau in position data after detection in the boundary zone to be indicative of a non-edge swipe gesture.

4. The method as defined in claim 1 wherein the method further comprises detecting and tracking a plurality of objects on the touch sensor.

5. The method as defined in claim 1 wherein the method further comprises characterizing the at least one pointing object as having rapid movement by:
   5) characterizing the at least one pointing object as initially appearing further away from the edge of the touch sensor than a slower pointing object when plotted on a graph; and
   6) characterizing the at least one pointing object as having a steeper position slope than a slower pointing object when plotted on a graph.

6. The method as defined in claim 1 wherein the method further comprises generating a graph of position versus time in order to determine if the at least one pointing object is performing an edge swipe gesture.

7. The method as defined in claim 6 wherein the method further comprises determining if the least one pointing object is performing an edge swipe gesture by analyzing position characteristics from the group of position characteristics comprised of constant slope after detection, degree of slope, initial position of the pointing object, and a combination of the position characteristics.

8. A system for distinguishing between an edge swipe gesture and other touch functions on a touch sensor, said system comprising:
   a capacitance sensitive touch sensor having an edge around a perimeter thereof;
   defining a boundary zone adjacent to the edge of the touch sensor, the boundary zone defining an area in which detection of an object may require analysis in order to determine if at least one object detected therein is performing an edge swipe gesture or another touch function; and
   providing touch function circuitry for gathering finger detection and position tracking data, wherein finger detection and position tracking data that shows that the at least one object has slid onto the touch sensor from a location that was off the touch sensor and that there is a pause in movement of the at least one pointing object immediately after detection in the boundary zone is characterized as a non-edge swipe gesture, wherein finger detection and position tracking data that shows that the at least one object has slid onto the touch sensor from a location that was off the touch sensor and that there is immediate movement of the at least one object immediately after detection in the boundary zone is characterized as an edge swipe gesture, and temporarily expanding the boundary zone adjacent to the edge of the touch sensor if the at least one pointing object is moving rapidly to thereby compensate for the rapid movement that might otherwise not be recognized as an edge swipe gesture.

9. A method for determining if at least one pointing object detected at an edge of a touch sensor is performing an edge swipe gesture or a different touch function, said method comprising:
   1) providing a touch sensor having an edge around a perimeter thereof and which gathers finger detection and position tracking data;
   2) detecting at least one pointing object in a boundary zone adjacent to the edge of the touch sensor, wherein the at least one pointing object has slid onto the touch sensor from a location that is off the touch sensor; and
   3) analyzing the finger detection and position tracking data, wherein finger detection and position tracking data that shows a pause in movement of the at least one pointing object immediately after detection in the boundary zone is characterized as a non-edge swipe gesture, wherein finger detection and position tracking data that shows immediate movement of the at least one object immediately after detection in the boundary zone is characterized as an edge swipe gesture, and temporarily expanding the boundary zone adjacent to the edge of the touch sensor if the at least one pointing object is moving rapidly to thereby compensate for the rapid movement that might otherwise not be recognized as an edge swipe gesture.

10. The method as defined in claim 9 wherein the step of analyzing the finger detection and position tracking data further comprises defining a constant upward or downward slope in position data to be indicative of the edge swipe gesture.

11. The method as defined in claim 10 wherein the step of analyzing the finger detection and position tracking data further comprises defining finger detection and position tracking data that shows a plateau in position data after detection in the boundary zone to be indicative of a non-edge swipe gesture.

12. The method as defined in claim 9 wherein the method further comprises detecting and tracking a plurality of objects on the touch sensor.

13. The method as defined in claim 11 wherein the method further comprises characterizing the at least one pointing object as having rapid movement by:
   4) characterizing the at least one pointing object as initially appearing further away from the edge of the touch sensor than a slower pointing object when plotted on a graph; and
   5) characterizing the at least one pointing object as having a steeper position slope than a slower pointing object when plotted on a graph.

14. The method as defined in claim 9 wherein the method further comprises generating a graph of position versus time in order to determine if the at least one pointing object is performing an edge swipe gesture.

15. The method as defined in claim 14 wherein the method further comprises determining if the least one pointing object is performing an edge swipe gesture by analyzing position characteristics from the group of position characteristics comprised of constant slope after detection, degree of slope, initial position of the pointing object, and a combination of the position characteristics.

* * * * *